(12) United States Patent
Curlier et al.

(10) Patent No.: US 10,247,108 B2
(45) Date of Patent: Apr. 2, 2019

(54) TURBOJET ENGINE WITH OFFSET FANS WITH A DIFFERENTIAL SYSTEM

(71) Applicant: SAFRAN AIRCRAFT ENGINES, Paris (FR)

(72) Inventors: Augustin Marc Michel Curlier, Boissise la Bertrand (FR); Sebastien Courtois, Evry (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 233 days.

(21) Appl. No.: 15/284,329

(22) Filed: Oct. 3, 2016

(65) Prior Publication Data

US 2017/0096942 A1 Apr. 6, 2017

(30) Foreign Application Priority Data

Oct. 5, 2015 (FR) ...................................... 15 59446

(51) Int. Cl.
| | |
|---|---|
| *F02C 7/36* | (2006.01) |
| *F16H 48/08* | (2006.01) |
| *F01D 5/02* | (2006.01) |
| *F02C 3/04* | (2006.01) |
| *F04D 29/053* | (2006.01) |
| *F04D 29/32* | (2006.01) |

(Continued)

(52) U.S. Cl.
CPC .................. *F02C 7/36* (2013.01); *F01D 5/02* (2013.01); *F02C 3/04* (2013.01); *F02C 3/107* (2013.01); *F02C 3/113* (2013.01); *F04D 29/053* (2013.01); *F04D 29/325* (2013.01); *F16H 48/08* (2013.01); *F05D 2220/323* (2013.01); *F05D 2240/35* (2013.01); *F05D 2240/60* (2013.01); *F05D 2250/312* (2013.01); *F05D 2260/40311* (2013.01)

(58) Field of Classification Search
None
See application file for complete search history.

(56) References Cited

U.S. PATENT DOCUMENTS

| | | | | |
|---|---|---|---|---|
| 4,025,221 A | * | 5/1977 | Kronogard | ................ F02C 7/36 60/39.163 |
| 4,270,408 A | * | 6/1981 | Wagner | ..................... F02C 6/02 74/402 |

(Continued)

FOREIGN PATENT DOCUMENTS

| | | |
|---|---|---|
| EP | 1541834 A1 | 6/2005 |
| FR | 1397983 A | 5/1965 |

(Continued)

OTHER PUBLICATIONS

French Search Report with English Language Translation Cover Sheet, dated Aug. 18, 2016, French Application No. 1559446.

*Primary Examiner* — Justin Holmes

(74) *Attorney, Agent, or Firm* — Womble Bond Dickinson (US) LLP

(57) ABSTRACT

A propulsion unit of an aircraft including a turbine (15), at least one fan (10) with an axis offset relative to the axis of the turbine and a power transmission mechanism between the turbine and the fan. The power transmission mechanism includes a speed reducing gear (20) with an input and a movement output, the input being in the extension of the axis (16) of the turbine and the output connected to the fan.

13 Claims, 5 Drawing Sheets

(51) Int. Cl.
*F02C 3/107* (2006.01)
*F02C 3/113* (2006.01)

(56) References Cited

U.S. PATENT DOCUMENTS

| | | | | |
|---|---|---|---|---|
| 4,936,746 A | * | 6/1990 | Mayo | B64C 11/306 |
| | | | | 416/128 |
| 5,024,639 A | * | 6/1991 | Crispo | B63H 5/10 |
| | | | | 440/58 |
| 5,239,880 A | * | 8/1993 | Hawkins | F16H 1/222 |
| | | | | 74/406 |
| 5,823,908 A | | 10/1998 | Stefanek | |
| 2008/0006023 A1 | | 1/2008 | Lardellier et al. | |
| 2010/0061839 A1 | * | 3/2010 | Bartolomeo | F02C 7/32 |
| | | | | 415/122.1 |
| 2016/0281609 A1 | * | 9/2016 | Mitrovic | F02C 6/206 |

FOREIGN PATENT DOCUMENTS

| | | | | |
|---|---|---|---|---|
| FR | 1557934 A | | 2/1969 | |
| FR | 2573816 A1 | * | 5/1986 | F02C 7/36 |

\* cited by examiner

TURBOJET ENGINE WITH OFFSET FANS WITH A DIFFERENTIAL SYSTEM

FIELD OF THE INVENTION

The present invention relates to the aeronautics field, and pertains to a propulsion unit including at least two fans driven by a same motor. It more particularly targets a power transfer system between the motor and the fans that it drives.

BACKGROUND OF THE INVENTION

The prior art of the present invention comprises documents FR-A-1,557,934 and EP-A1-1,541,834.

The present applicant has undertaken work pertaining to a propulsion unit architecture with two or more than two distributed fans. The purposes of the latter are to seek to optimize the propulsion performance owing to a by-pass ratio, while retaining an acceptable ground clearance of the aircraft and smaller fans, with different fan ratings.

The block diagram of such a unit is shown in FIGS. 1 and 2. A gas generator 3 traditionally comprises a compression unit supplying air to an annular compression chamber; the combustion gases leaving the chamber drive one or several turbines, mechanically connected to the compressor, and here a free turbine 5. The latter is secured to a power shaft 6 coaxial to the gas generator 3. This power shaft 6 drives, through appropriate conical gears, two intermediate radial shafts 8 and 8' in particular arranged at a right angle relative to the axis of the power shaft 6. The intermediate radial shafts each drive a fan shaft 9, 9' offset relative to the axis of the power shaft, i.e., having an offset axis and being parallel to the axis. The power transmission is done via first gears 2 and 2' with bevel pinions between the shaft 6 and the radial shafts 8 and 8' and second gears 4 and 4' with bevel pinions between the radial shafts 8, 8' and the fan shafts 9 and 9'. The shafts of the fans 9 and 9' each drive a fan 10, 10' with an axis parallel to that of the motor. Such an arrangement makes it possible to achieve the aims set out above.

According to the prior art known by the applicant, the solution to the transmission problem between the free turbine and the fan shaft consists of using, for each of the fans, angular members with single bevel gears at 45°: A first gear, with two wheels of the same diameter, one on the shaft of the free turbine and the other on the radial shaft, and a second tapered gear at 45° with two wheels of different diameters connecting the radial shaft to that of the fan.

One can see that the two fans are inevitably called upon to operate at very slightly different ratings, even in a normal situation. Indeed, during nominal operation, a slight asymmetry necessarily appears between the torques consumed in the two fans for example resulting from a different angle of attack of the air flows between the two fans, different frictions in the bearings, slightly different inertias and blading shapes.

Yet the kinematic diagram proposed above is based on a single angular member between the turbine shaft and two radial shafts making it possible to provide the required power to the modules of the fans. As a result, it is kinematically impossible for the two lines of fan shafts to rotate at different speeds. Such an arrangement results in driving the generation of stray shearing stresses, which may potentially have a very high amplitude, in the shaft lines of the fans.

The invention relates to the development of means able to provide a non-uniform kinematic distribution capacity between the two fans.

The invention also aims to propose a propulsion system architecture with multiple distributed fans equipped with a separating device making it possible to separate the kinematic behaviors of the transmission shafts of the fans and thus to be able to introduce differential loads on each of them without constraining the entire transmission chain.

BRIEF DESCRIPTION OF THE INVENTION

These aims are achieved according to the invention with a propulsion unit of an aircraft comprising a turbine secured to a turbine shaft, at least two fans with offset axes relative to the axis of the turbine and a power transmission mechanism between the turbine and the fans, the power transmission mechanism comprising a differential system comprising a casing, an axial input shaft connected to the turbine shaft, a planet carrier driven by the input shaft, planet gears mounted on the planet carrier, at least one idler gear supported by the casing and radial shafts each perpendicular to the axial input shaft, the radial shafts each driving one of said fans and being secured to planet gears, the planet carrier and the input shaft being coaxial, the planet carrier forming a hub on which the rotation axes of the planet gears are radially arranged.

The differential system according to the invention has the dual advantage of a reduced bulk and a balanced distribution of the masses around the axis of the input shaft. These properties make the system able to be incorporated into a turbine engine. In particular, the system proposes a size distribution of the differential centered on the driving axis, since the available bulk is reduced and also centered on the driving axis. The system also presents a dynamic situation close to the known reducing gears, since it does not include a large wheel rotating perpendicular to the driving axis and/or at a distance from that axis.

According to one feature of the invention, the radial shafts are arranged on either side of the axis of the input shaft.

According to one preferred embodiment, the differential system comprises two mobile wheels rotatable around the input shaft, each mobile wheel having a first annular gear and a second annular gear, which is toothed. Advantageously but non-limitingly, the first and second annular gears of one mobile wheel being turned toward the first and second annular gears of the other mobile wheel, with each first annular gear of these mobile wheels arranged across therefrom meshing with the planet gears and each second annular gear meshing separately with one of said idler gears.

In particular according to one particular embodiment, the shafts of the planet gears are arranged in different planes perpendicular to the input shaft.

According to another particular embodiment, the shafts of the planet gears are arranged in a same plane perpendicular to the input shaft, the two second annular gears of the rotating mobile wheels then not having the same radius.

According to one embodiment, the axes of the radial shafts are parallel.

According to another embodiment, the axes of the radial shafts are transverse.

More particularly, the mobile wheels each have an axial journal mounted in the casing via a bearing, in particular, the hub being supported by one of said journals via a bearing.

The differential system according to the invention is arranged between the shaft of the turbine and the shafts arranged radially relative to the shaft of the turbine, each driving one of said fans.

According to one feature of the invention, the planet gears are arranged between the mobile wheels.

In particular, the first and second annular gear of each wheel are respectively arranged on either side of the planet gears along the axis of the radial shafts.

Preferably, the turbine is driven by the gases from a gas generator and the gas generator is a gas turbine engine with an exhaust case comprising two concentric shrouds, one inner and the other outer, defining the engine gas tunnel between them downstream from the turbine, the differential system being housed inside the inner shroud.

In this configuration, the radial shafts traverse the shrouds of the exhaust case of the gas turbine engine.

BRIEF DESCRIPTION OF THE FIGURES

Other features and advantages will emerge from the following description of two non-limiting embodiments of the invention, in reference to the appended drawings, in which.

DETAILED DESCRIPTION OF THE INVENTION

Figure 1:
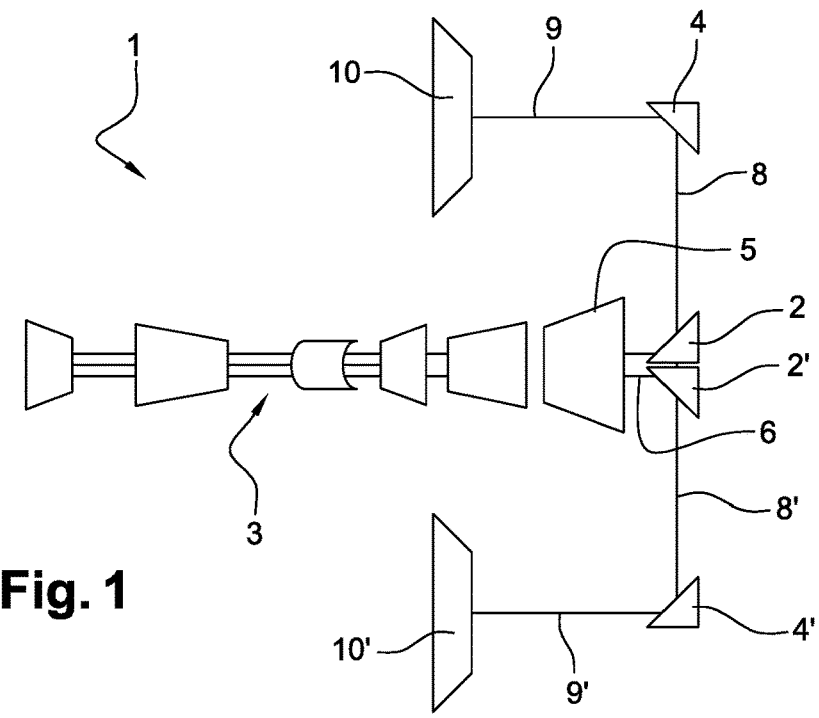
FIG. 1 is a diagrammatic illustration of an aircraft propulsion unit architecture.
Figure 2:
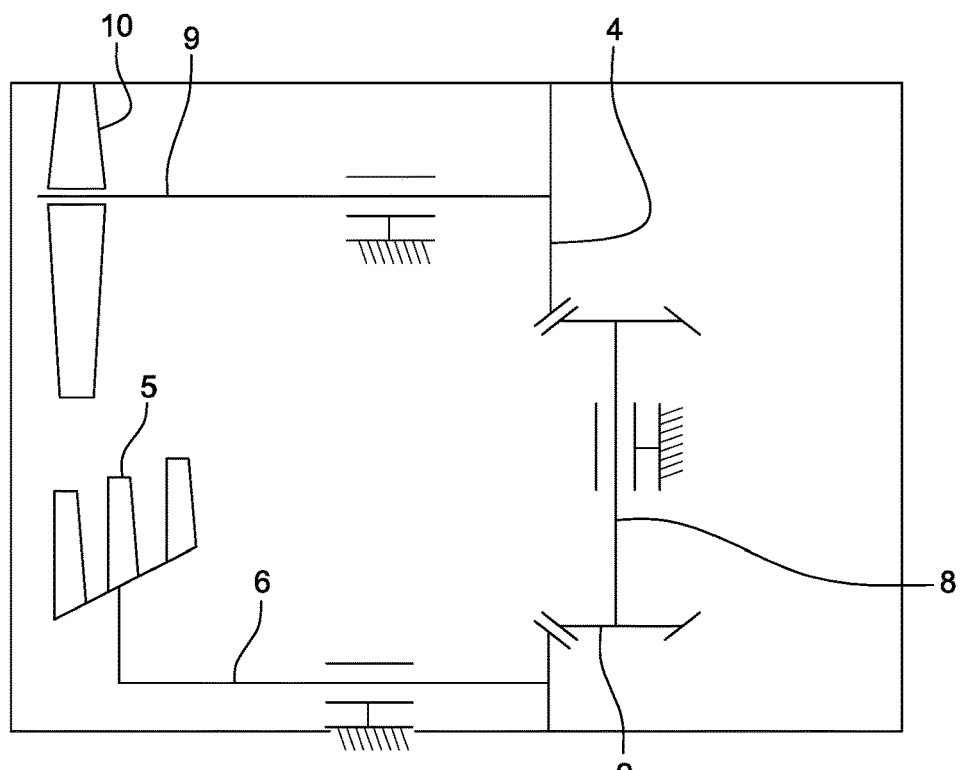
FIG. 2 shows an arrangement of bevel pinions in the driving of the fan shaft by the turbine shaft according to the architecture of FIG. 1.
Figure 3:
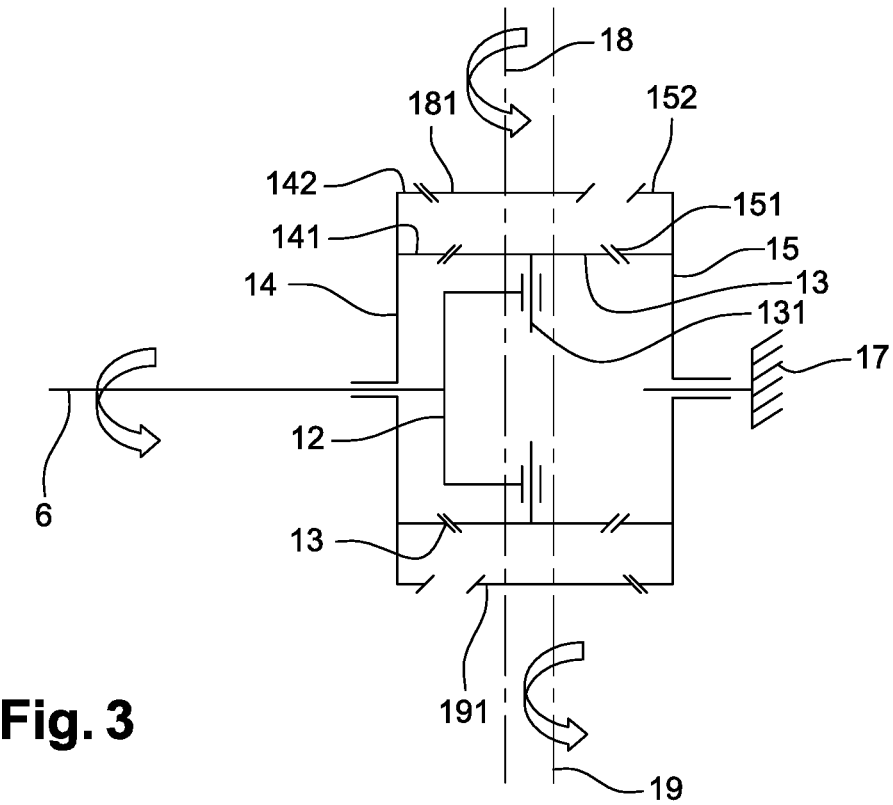
FIG. 3 is a diagrammatic illustration of a differential system according to the invention.

In reference to FIG. 3, a differential system is shown of a power transmission mechanism of a propulsion unit as illustrated in FIGS. 1 and 2. The propulsion unit comprises a gas generator with a free power turbine secured to a power shaft and two fans with offset axes relative to the axis of the free power turbine 5. Here, the shaft of the power turbine is directly connected to the input shaft 6 of the differential. A planet carrier 12 driven by the shaft 6 is mounted in the extension of this axis of the input shaft 6. The planet carrier 12 is supported via appropriate bearings by the casing of the machine 17, not shown in FIG. 3. This planet carrier 12 comprises, around its axis and in a same plane perpendicular thereto, a plurality of radial housings. The shafts 131 of planet gears 13 are mounted in these housings.

Two mobile wheels 14 and 15 are mounted via bearings in the casing, their respective rotation axis and the input shaft 6 being coaxial. The mobile wheels each comprise a first toothed annular gear 141, 151, respectively, and a second toothed annular gear 142, 152, respectively. The first annular gears 141, 151, respectively, have the same radius, are arranged in two planes perpendicular to the axis of the input shaft 6 while being opposite one another and axially remote from one another so as to mesh on the planet gears 13. In other words, the first annular gears 141, 151 of the mobile wheels 14, 15 are arranged opposite one another. Here, the teeth of the planet gears are at 45° relative to the axis of the input shaft 6. The mobile wheels 14 and 15 each bear a second toothed annular gear 142, 152, respectively. The second toothed annular gear 142 of the wheel 14 has a diameter larger than that of the first annular gear 141 and meshes with a pinion 181 with a radial axis 18. The radial shaft 18 extends outwardly toward a fan and drives one of the offset blades via an angular member at 90°. Likewise, the wheel 15 comprises a second toothed annular gear 152, here with a radius substantially equal to that of the annular gear 142 of the wheel 14. The annular gear 152 meshes with a pinion 191 secured to a radial shaft 19. The two radial shafts are not placed in a same plane perpendicular to the axis of the input shaft 6. Here, the axes of the radial shafts are parallel. They are arranged on either side of the axis of the input shaft 6 so as to be able to drive the offset fans. In particular, the radial shafts are arranged substantially opposite one another. The radial shaft 19 is connected by an appropriate angular member to the driveshaft of a different fan from the one before with an offset axis relative to the axis of the input shaft 6. The pinions 181 and 191 with their respective shafts are supported by the casing 17 of the turbomachine. They form the angular return pinions of the differential system.

The differential system according to the invention works as follows: when the loads applied on the shafts 18 and 19 are the same, the input shaft 6 rotates the planet carrier 12 and the wheels 14 and 15 around their axis via planet gears 13. The outer second annular gears each separately rotate an idler gear 181 and 191, respectively, and the shafts 18 and 19. In this scenario, the load outwardly applied on the shafts 18 and 19 is the same. It follows that the two idler gears 181 and 191 rotate at the same speed around their respective shaft 18 and 19.

If the loads applied on the fans are not identical, an imbalance follows between the rotation speeds of the shafts 18 and 19 and between the idler gears 181 and 191, respectively. The mobile wheels 14 and 15 are then made to rotate at different speeds relative to one another. This is made possible by the planet gears, which can rotate around their axis in the planet carrier.

Figure 4:
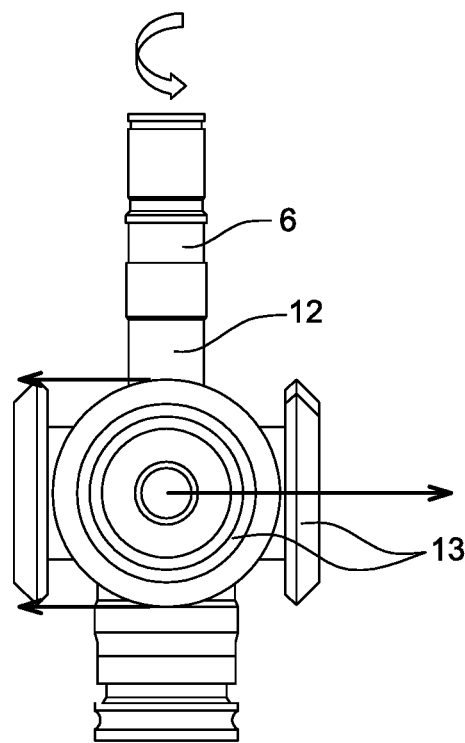
FIGS. 4 and 5 show the distribution of forces on either side of the planet gears based on the loads applied on the drive shafts of the fans.
Figure 5:
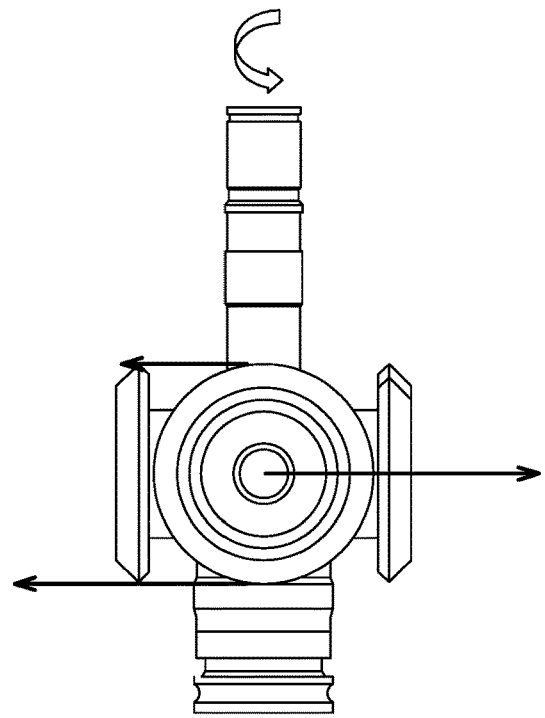

The invention therefore makes it possible to drive fans, at least two, with offset axes while absorbing the differences between the loads to which they are subjected. FIGS. 4 and 5 illustrate the rotation of the planet gears around their respective axis when an imbalance appears between the reaction forces relative to the differential. When the loads are the same on both fans, FIG. 4, the forces applied on either side of the idler gears are balanced and the mobile wheels 14 and 15 rotate at the same speed. When the loads applied on either side of the planet gears are no longer balanced, the planet gears 13 rotate around their axis at different speeds allowing the mobile wheels 14, 15 and the idler gears to rotate at different rotation speeds.

Figure 6:
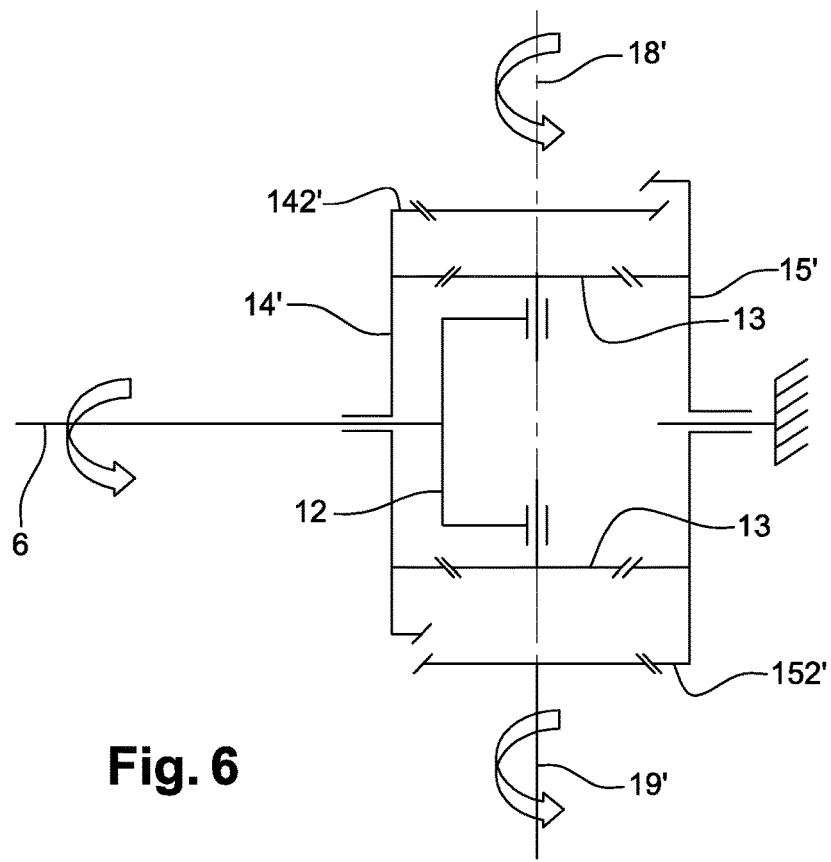
FIG. 6 is a diagrammatic illustration of an alternative of a differential system according to the invention.

FIG. 6 shows an alternative embodiment of the differential system. The two shafts 18' and 19' each drive a fan and are arranged in this embodiment in a same plane perpendicular to the axis of the turbine. The radial shafts are arranged on either side of the axis of the input shaft 6 so as to be able to drive the offset fans. In particular, the radial shafts are arranged substantially opposite one another. In order to allow each of the two mobile wheels 14' and 15' to drive one of the two shafts 18 or 19 separately and individually, it is then necessary for the diameters of two second annular gears 142' and 152' to be different, as shown in the figure. The operation is the same as the previous embodiment.

Figure 7:
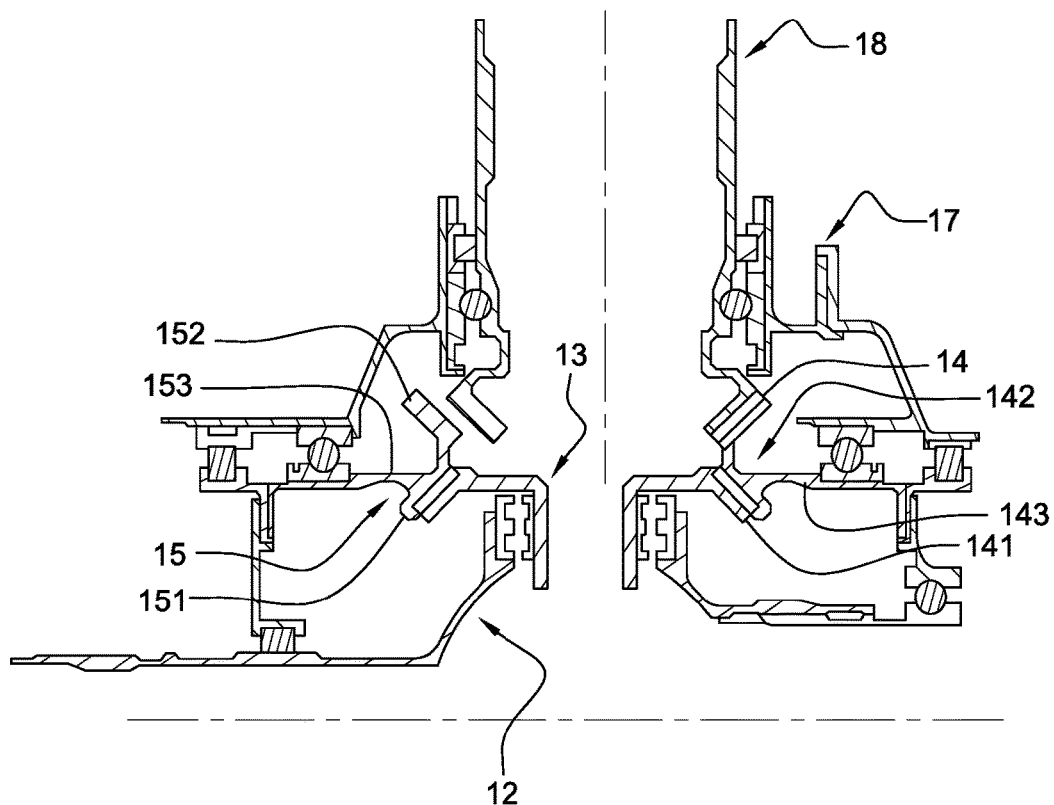
FIG. 7 shows a practical exemplary embodiment of the differential according to the invention.

FIG. 7 shows a practical exemplary embodiment of the differential system according to the invention. It will be noted that in this case, the mobile wheels 14 and 15 are supported by the casing 17 and each comprise a journal 143 and 153, respectively, each connected by ball bearings or rolling bearings to the casing 17. The satellite carrier 12 is supported by appropriate bearings by the journals.

Figure 8:
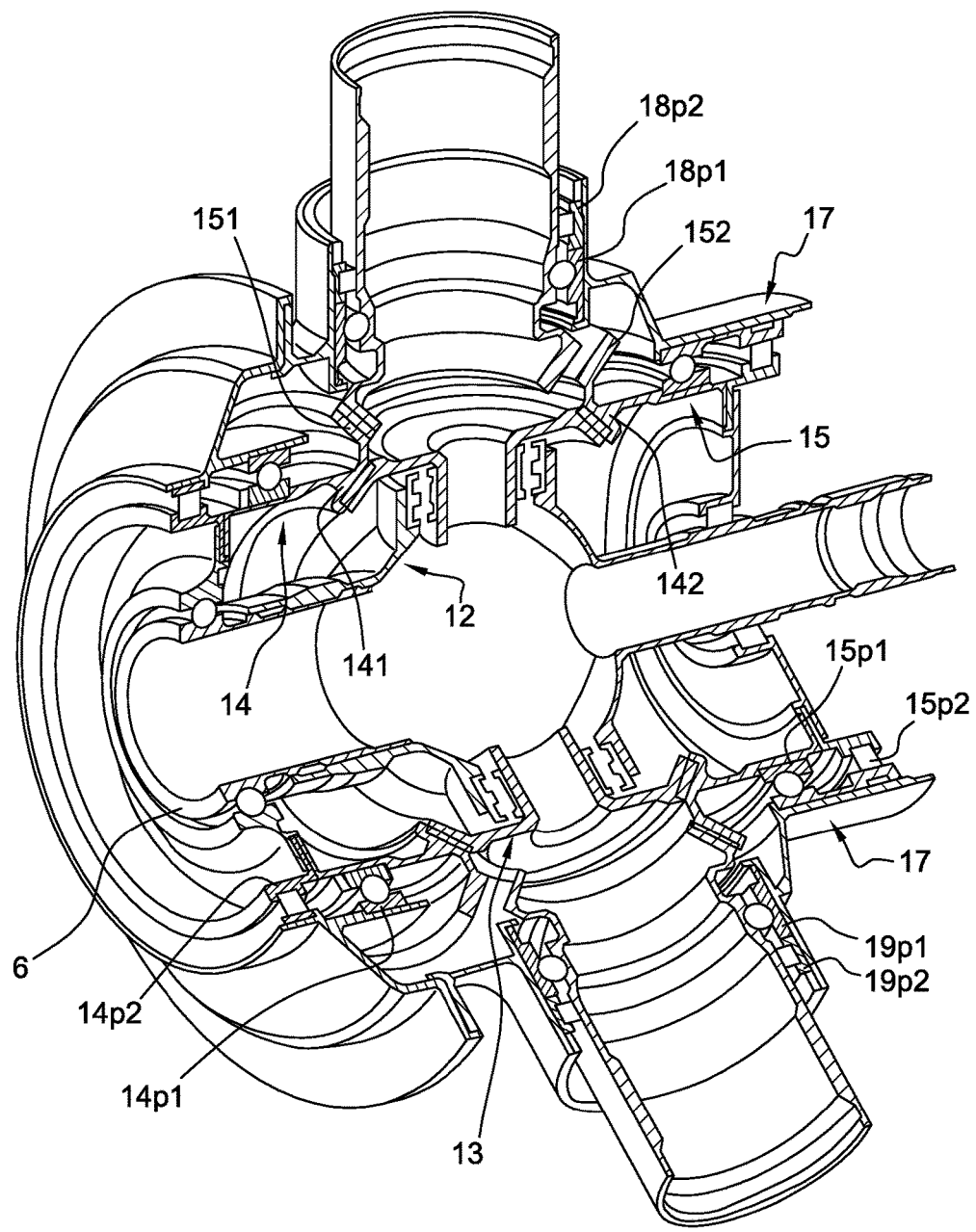
FIG. 8 is a perspective sectional view of the differential system according to the invention.

In particular, in FIG. 8, where the differential system is shown in a prospective sectional view, the casing 17 is arranged so as to guide the radial shafts 18, 19 and the mobile wheels 14, 15 and keep them in position. The radial shafts 18, 19 are not in the same plane. They are arranged on either side of the axis of the input shaft and their axes are substantially transverse. The mobile wheels 14, 15 are mechanically connected to the casing 17 using two pairs of bearings, including one ball bearing 14$p$1, 15$p$1 and one rolling bearing 14$p$2, 15$p$2 that ensure their rotational guiding. The radial shafts 18, 19 are also supported by a pair of bearings comprising one ball bearings 18$p$1, 19$p$1 and one rolling bearing 18$p$2, 19$p$2. This double bearing configuration (ball bearings and rolling bearings) and the fact that the ball bearings are arranged as close as possible to the teeth of the idler gears 181, 191 and the first and second annular gears 141, 151, 142, 152 makes it possible to have a good transmission quality and good dynamic holding. This also makes it possible to avoid stresses.

The invention claimed is:

1. A propulsion unit of an aircraft comprising a turbine secured to a turbine shaft, at least two fans with offset axes relative to the axis of the turbine and a power transmission mechanism between the turbine and the fans, wherein the power transmission mechanism comprises a differential system comprising a casing, an axial input shaft connected to the turbine shaft, a planet carrier driven by the input shaft, planet gears mounted on the planet carrier, at least one idler gear supported by the casing and radial shafts each perpendicular to the axial input shaft, the radial shafts each driving one of said fans and being secured to idler gears, the planet carrier and the input shaft being coaxial, the planet carrier forming a hub on which the rotation axes of the planet gears are radially arranged.

2. The propulsion unit according to claim 1, wherein the radial shafts are arranged on either side of the axis of the input shaft.

3. The propulsion unit according to claim 1, wherein it comprises two mobile wheels rotatable around the input shaft, each wheel having a first toothed annular gear and a second toothed annular gear, each first annular gear of the mobile wheels meshing with the planet gears being arranged opposite therefrom, and each second annular gear meshing separately with one of said idler gears.

4. The propulsion unit according to claim 3, wherein the shafts of the idler gears are placed in different planes perpendicular to the input shaft.

5. The propulsion unit according to claim 1, wherein the shafts of the idler gears are in a same plane perpendicular to the input shaft, the radii of the two second annular gears of the rotating mobile wheels being different.

6. The propulsion unit according to claim 1, wherein the axes of the radial shafts are parallel.

7. The propulsion unit according to claim 1, wherein the axes of the radial shafts are transverse.

8. The propulsion unit according to claim 2, wherein the rotating mobile wheels each have an axial journal mounted in the casing via a bearing.

9. The propulsion unit according to claim 8, wherein the hub is supported by one of said journals via a bearing.

10. The propulsion unit according to claim 1, wherein the different system is arranged between the shaft of the turbine and the radial shafts each driving one of said fans.

11. The propulsion unit according to claim 10, the turbine of which is driven by a gas generator.

12. The propulsion unit according to claim 11, wherein the gas generator is a gas turbine engine with an exhaust case comprising two concentric shrouds, one inner and the other outer, defining the engine gas tunnel downstream from the turbine, the differential system being housed inside the inner shroud.

13. The propulsion unit according to claim 12, wherein the radial shafts traverse the shrouds of the exhaust case.

* * * * *